(12) United States Patent
Frank

(10) Patent No.: US 6,313,543 B1
(45) Date of Patent: Nov. 6, 2001

(54) GENERATOR SYSTEM WITH VERTICALLY SHAFTED ENGINE

(75) Inventor: Kenneth M. Frank, Karney, NE (US)

(73) Assignee: Coleman Powermate, Inc., Wichita, KS (US)

(*) Notice: Subject to any disclaimer, the term of this patent is extended or adjusted under 35 U.S.C. 154(b) by 0 days.

(21) Appl. No.: 09/707,062

(22) Filed: Nov. 6, 2000

Related U.S. Application Data

(62) Division of application No. 09/566,960, filed on May 9, 2000, now Pat. No. 6,181,019, which is a division of application No. 09/133,864, filed on Aug. 13, 1998, now Pat. No. 6,084,313.

(51) Int. Cl.$^7$ ...................................................... H02K 5/00
(52) U.S. Cl. ................................................ 290/1 A; 123/2
(58) Field of Search ................................... 290/1 A, 1 B, 290/2, 40 R, 46; 322/1; 123/2

(56) References Cited

U.S. PATENT DOCUMENTS 3,259,752 * 7/1966 Honda .................................. 290/1 R
4,284,913 * 8/1981 Barnhardt ............................... 510/54

(List continued on next page.)

FOREIGN PATENT DOCUMENTS 2565740    4/1985  (FR) .

OTHER PUBLICATIONS

Ultra 2500 (TM) Electric Generator, Coleman Powermate (R), 1997, (2 pages).
Ultra 2500 (TM) Electric Generator, PMO422505 with Portability Cart, Coleman Powermate (R), 1996 2 pages).
Ultra 2500(TM) Electric Generator, PM0422500 with Carry Handle, PM042205 with Cart, Coleman Powermate (R), 1996 (2 pages).

(List continued on next page.)

Primary Examiner—Nicholas Ponomarenko
(74) Attorney, Agent, or Firm—Rockey, Milnamow & Katz, Ltd.

(57) ABSTRACT

A portable generator system includes an interface mounting element for supporting a selected engine, from a plurality of engines, with a vertically oriented output shaft when the generator system is positioned on a substantially horizontal surface. A generator is directly coupled to the output shaft of the engine and rotates therewith about a common axis. The generator is selectable from a plurality of generators having different output power characteristics. A movable support cart supports interface, engine and generator and is formed of a single piece of tubular stock. The tubular stock is bent to form two substantially parallel, displaced, U-shaped regions bounded by a third U-shaped region substantially perpendicular thereto wherein the interface element, the selected engine and the selected generator are supported and protected. The cart supports first and second displaced wheels which rotate about a common axis which extends between the first and second regions, parallel to the third region. A fuel tank is carried on the cart and extends from the first side of the axis while the interface extends from the second side enabling the fuel tank to counterbalance the weight of the selected engine, the selected generator and the interface about the axis of rotation of the wheels.

10 Claims, 17 Drawing Sheets

U.S. PATENT DOCUMENTS

| | | | |
|---|---|---|---|
| 4,540,888 | * | 9/1985 | Drewry et al. .................. 290/1 R |
| 4,677,940 | * | 7/1987 | Bracht et al. ..................... 123/2 |
| 4,721,070 | * | 1/1988 | Tanaka et al. ..................... 123/2 |
| 4,779,905 | * | 10/1988 | Ito et al. .................. 290/1 B |
| 4,856,470 | * | 8/1989 | Ishi et al. .................. 123/195 C |
| 4,859,886 | * | 8/1989 | Tanaka et al. .................. 310/51 |
| 4,885,492 | * | 12/1989 | Sickle .................. 310/113 |
| 4,907,546 | * | 3/1990 | Ishii et al. .................. 123/41.56 |
| 4,926,108 | * | 5/1990 | Schooley et al. .................. 322/15 |
| 5,011,442 | * | 4/1991 | Polcz et al. .................. 440/900 |
| 5,039,930 | * | 8/1991 | Collier et al. .................. 320/2 |
| 5,095,701 | * | 3/1992 | Nakano .................. 60/521 |
| 5,111,127 | * | 5/1992 | Johnson .................. 320/2 |
| 5,121,715 | * | 6/1992 | Nogami et al. .................. 123/41.7 |
| 5,469,820 | * | 11/1995 | Data et al. .................. 123/192.2 |
| 5,515,816 | * | 5/1996 | Ball et al. .................. 123/41.7 |
| 5,546,901 | * | 8/1996 | Acker et al. .................. 123/195 C |
| 5,574,622 | * | 11/1996 | Brown .................. 361/625 |
| 5,626,105 | * | 5/1997 | Locke .................. 123/3 |
| 5,890,460 | * | 4/1999 | Ball et al. .................. 123/41.7 |
| 6,084,313 | * | 7/2000 | Frank .................. 290/40 C |
| 6,181,019 | * | 1/2001 | Frank .................. 290/1 A |

OTHER PUBLICATIONS

Maxa(R) Series Electric Generators, Coleman Powermate (R), 1995, (2 pages).

Sport and Pulse Series Portable Genreators, Coleman Powermate(R) (2 pages).

Generators, Coleman Powermate(R) 1997 (18 pages).

Maxa(R) ER Series Electric Generators, Coleman Powermate (R) 1995, (2 pages.

Powerbase and Powerbase ER Series Electric Generators, Coleman Powermate (R) (4 pages).

Vantage (TM) Series Electric Generators, Coleman Powermate (R) (2 pages).

Electric Generators, Pressure Washers, Compressors, Coleman Powermate (R) (8 pages).

* cited by examiner

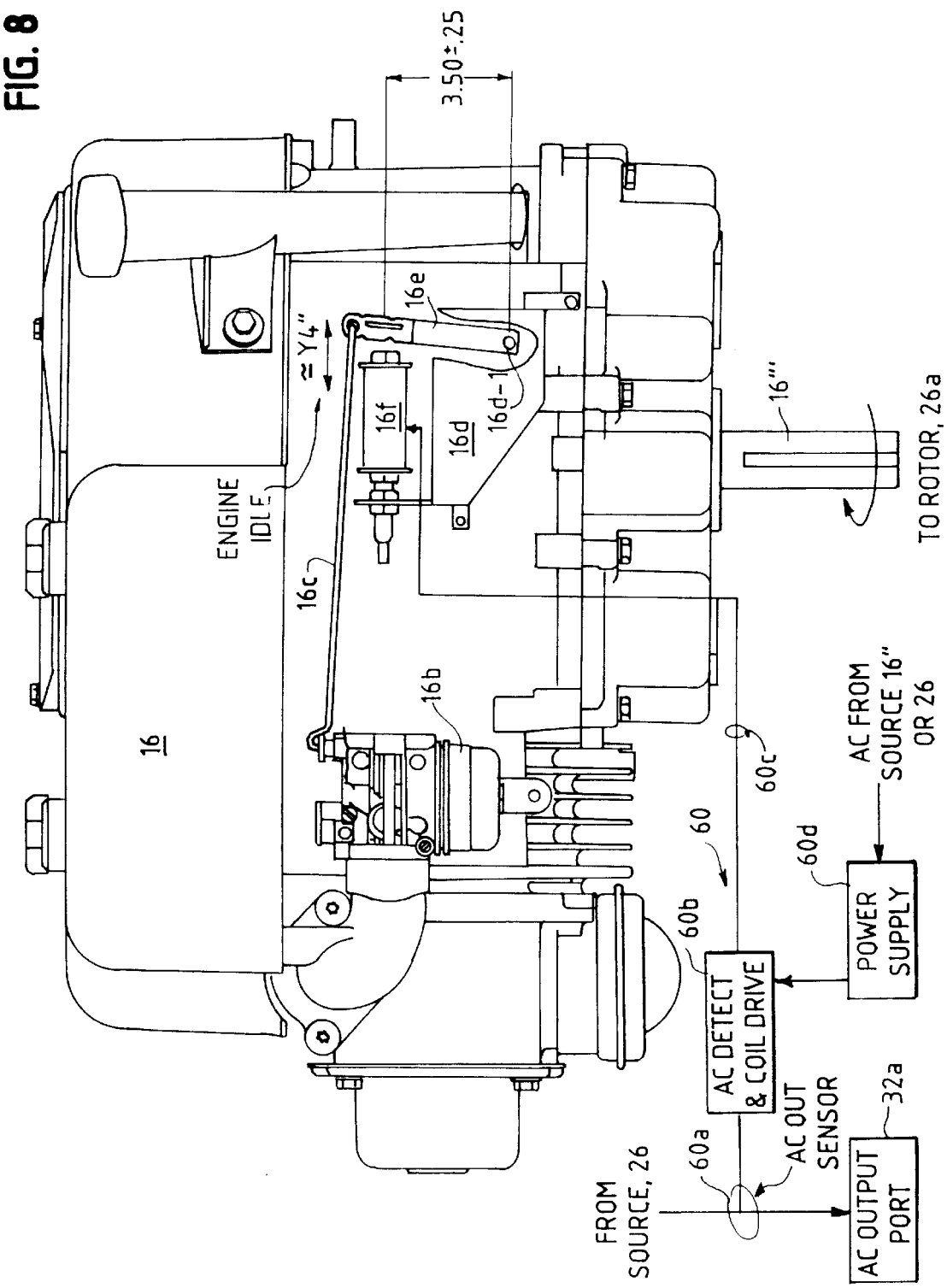

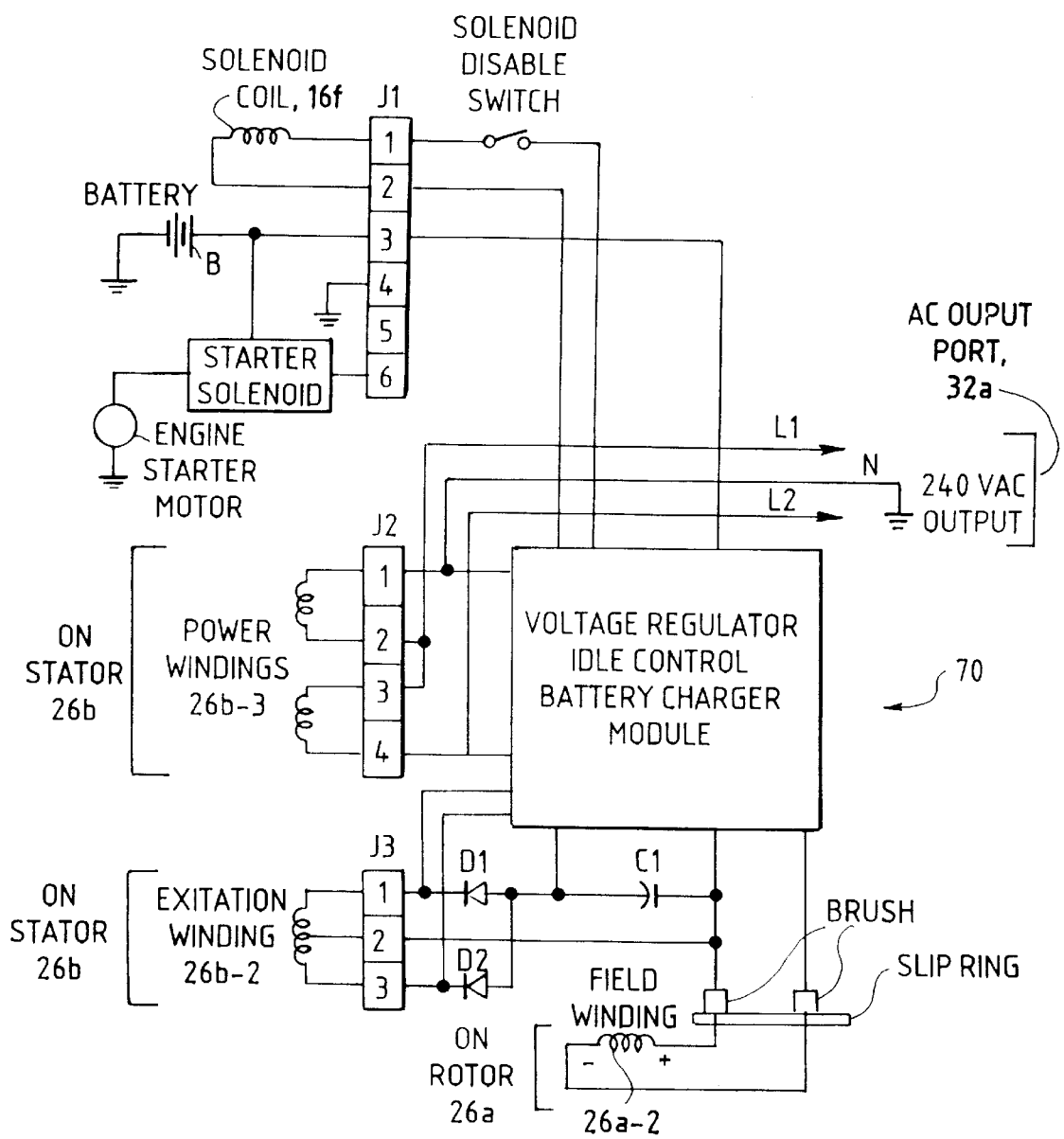

GENERATOR SYSTEM WITH VERTICALLY SHAFTED ENGINE

This application is a divisional application of Ser. No. 09/566,960 filed May 9, 2000 now U.S. Pat. No. 6,181,019 which was a divisional application of Ser. No. 09/133,864, filed Aug. 13, 1998 now U.S. Pat. No. 6,084,313.

FIELD OF THE INVENTION

The invention pertains to portable electric generators. More particularly, the invention pertains to such generators wherein members of a plurality of different engines having vertically aligned output shafts can be easily incorporated using common mounting hardware.

BACKGROUND OF THE INVENTION

Portable generators driven, for example, by gasoline engines are known and provide Convenient sources of electrical energy at construction sites, camp sites, temporary sports activities and the like. Many known portable generator systems use engines with horizontally oriented output shafts.

It has also been known to combine generators or alternators with gasoline engines with output shafts which are designed to have a vertical orientation when the engine is in operation. Such engine configurations are commonly found, for example, on lawn mowers.

It would be desirable to be able to take advantage of a number of different types of available gasoline engines with vertically oriented drive shafts in portable generator products. Preferably, the fact that different engines might originate from different manufacturers would not increase the inventory or manufacturing costs which underlie the production of such products. Rather, it would be desirable to be able to readily incorporate a variety of engine types and generator sizes so as to provide for increased manufacturing and inventory flexibility.

SUMMARY OF THE INVENTION

A generator system usable with a plurality of different engines includes a modular engine interface adapted to be coupled one at a time, to each member of the plurality of different engines. A generator or alternator can be selected from a plurality of electrical sources having different output characteristics and coupled to the interface. The coupled engine/interface/source combination will be oriented, in normal operation, such that the drive shaft of the engine is substantially vertical while rotating.

In one aspect, a cart can be provided for protection and to facilitate movement of the system. The cart is formed of a length of tubular-type material which can be bent at a plurality of regions so as to form first and second spaced apart U-shaped sections which extend generally along each side of the coupled engine/interface/source combination.

A third U-shaped section extends between the first and second sections, generally perpendicular thereto, and forms an internal region in which the engine/interface/source combination is located. The first, second and third U-shaped regions extend past the selected engine and the selected source.

Coupled to a portion of each of the first and second U-shaped regions is at least one rotatably mounted wheel having an axis of rotation which extends between the first and second sections, generally parallel to the third section. The cart can be pivoted about the axis of rotation and rolled.

In yet another aspect a fuel tank is mounted on the cart, displaced on the other side of the axis of rotation from the engine/interface/source combination. The fuel tank produces a torque which counterbalances the torque generated by the combination while the cart is being rolled.

The fuel tank is symmetrical, in one aspect, about a central plane which extends substantially perpendicular to the interface and perpendicular to the third U-shaped section. The fuel tank is positioned between a user attempting to roll the cart and the combination. The fuel tank includes a molded depression to facilitate the user pivoting the cart for movement.

A muffler is located substantially below the engine, adjacent to the source. When a user is moving the system, the fuel tank and the engine are interposed between the user and the muffler.

In yet another aspect, where the source includes an alternator, a governor can be coupled to the engine to control engine speed to produce a 50–60 Hz electrical output. Circuitry can be included to override the governor in no load situations. Engine speed can be permitted to drop to a relatively low RPM idle conserving fuel and reducing operating noise.

A current sensor, for example, coupled to the electrical output port can detect an output current flow. In such an instance, the governor can be enabled resulting in the engine returning to an RPM sufficient to supply 60 Hz current and voltage. The circuitry can be powered off of a supplemental alternator contained in an engine starting motor assembly (when an electric start function is provided) or off of a separate output coil in the source.

In another aspect, the wheels can be rotatably supported on a molded hub. The hub can slidably engage a non-rotating axle that could have a non-circular cross section. A portion of the hub can rotatably support a wheel. The wheel can be retained on one side by a biased latch (enabling the wheel to slide thereover for installation) and a non-rotating cap carried on the hub.

Cord retainers formed as elongated wire or plastic members slidably receive electrical cords to be connected to electrical output ports of the system. The retainers inhibit accidental disconnection of the cords from the ports.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 8 illustrates a system for controlling the output speed of an engine of the system of FIG. 1; and FIG. 9 is a schematic of an electronic control module.

DETAILED DESCRIPTION OF THE PREFERRED EMBODIMENTS

Figure 1A:
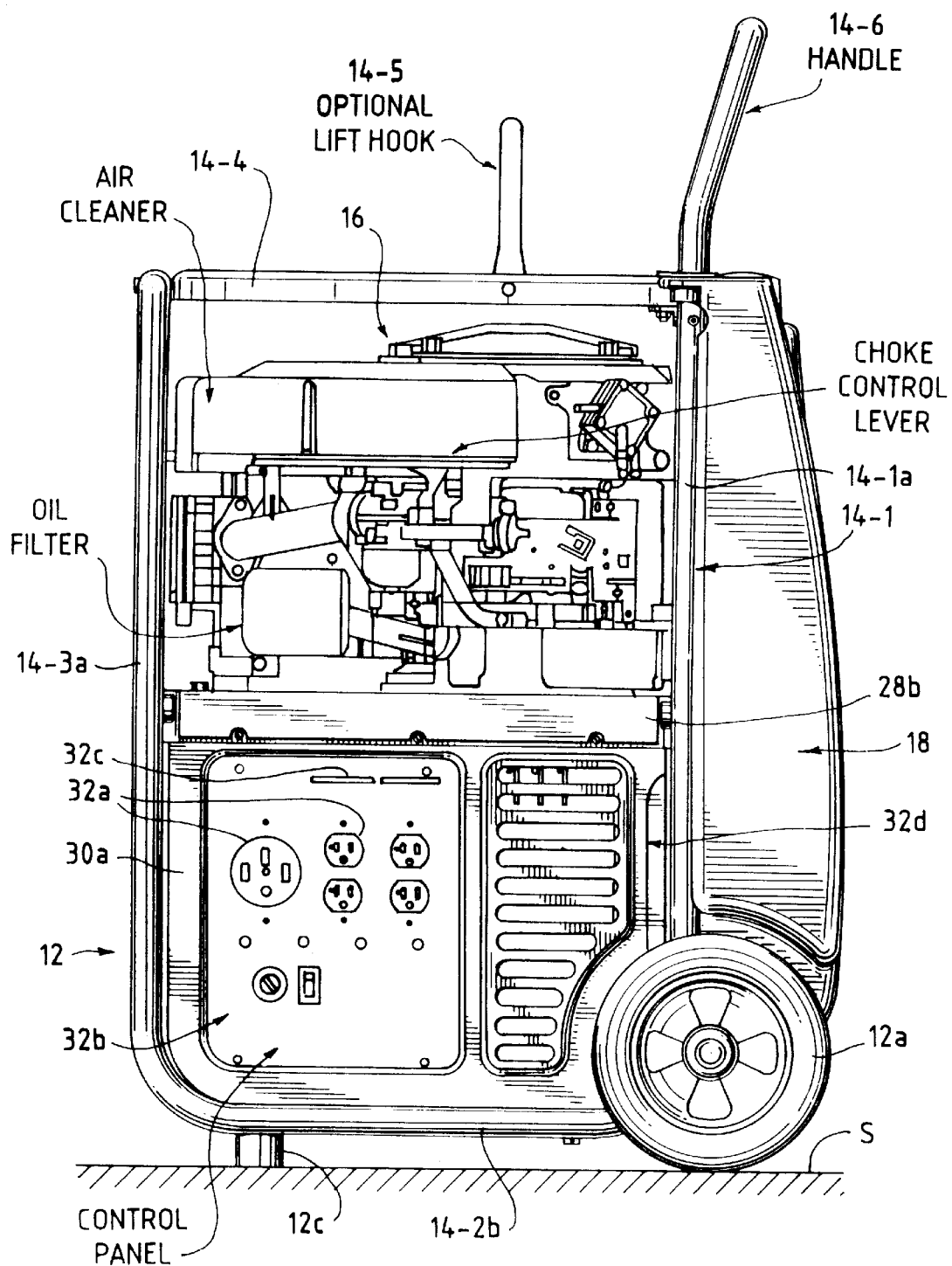
FIG. 1A is a side view of an electrical generation system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIGS. 1A–1F illustrate different views of a movable system 10 for providing electrical energy. The system 10 is a source of portable electrical energy for business, recreational, residential or emergency use.

The system 10 is carried on a cart, generally indicated at 12. The cart 12 is movable on wheels 12a, 12b.

As will be discussed in more detail subsequently, the cart 12 is formed primarily of a single tubular member which is configured to provide both a support and a protective region for the components of the system 10. The cart 12 is formed with two, spaced-apart, generally L-shaped sections 14-1 and 14-2. The sections 14-1, 14-2 each include an upright leg 14-1a, 14-2a. The upright legs are joined by a smooth, substantially 90°, curve to lower legs 14-1b and 14-2b.

In normal operation, the system 10 is oriented with wheels 12a, 12b on a supporting surface S, for example, a floor. With this orientation, legs 14-1a and 14-2a are substantially vertically to the surface S. Legs 14-1b and 14-2b extend substantially parallel to and adjacent to the surface S. Rubberized feet 12c, d support a front section of each of the horizontal legs 14-1b and 14-2b relative to the surface S with a substantially horizontal orientation.

The cart 12 also includes an integrally formed, inverted, generally U or V-shaped front region having first and second curved sections or legs 14-3a,b. The legs 14-3a,b are integrally formed with the L-shaped sections 14-1, -2. They are joined therewith by integrally formed substantially right angle curves adjacent the supporting feet 12c,d.

The legs 14-3a, -3b curve toward one another and are joined by a substantially horizontal connecting element or leg 14-3c. The element 14-3c is substantially perpendicular to the legs 14-1b, 14-2b and displaced therefrom.

The connecting leg 14-3c is coupled to an upper end of each of the legs 14-1a, -2a by a substantially horizontally oriented cover element 14-4. The element 14-4 in addition to providing improved mechanical stability for the cart 12 can also function as a guard to keep undesirable foreign materials from entering an engine 16 via an air intake thereof 16a. The element 14-4 can also support an optional lift hook 14-5 which can be used to lift and move the system 10.

Coupled to an upper end of each of the legs 14-1a. -2a is a handle 14-6 which, in combination with wheels 12a, b can be used by an operator to pivot the system 10 about an axis of rotation of the wheels 12a, b for purposes of moving same from one location to another on the surface S.

The engine 16 can be any one of a plurality of internal combustion engines, such as gasoline powered engines of the type that have vertical output shafts. When mounted in the cart 12, the output shaft of the engine 16 extends substantially parallel to the legs 14-1a, -2a and substantially perpendicular to the supporting surface S.

It will be understood that the exact characteristics of the engine 16 are not a limitation of the present invention. A wide variety of internal combustion engines can be used with the system 10, in accordance with the present invention, without departing from the spirit and scope of the present invention.

Engine 16 obtains fuel from a tank 18. The tank 18 can be molded out of plastic or formed of metal. The tank 18 is elongated and extends, preferably from where handle 14-6 engages legs 14-1a, 14-2a past engine 16 and past a support for wheels 12a, b (best illustrated in FIG. 3).

The tank 18 is positioned on one side of the axis of rotation of the wheels 12a, b. Remaining equipment carried on the cart 12 is located on an opposite side of the axis of rotation of the wheels 12a, b such that the fuel tank 18 counterbalances the weight thereof.

Fuel tank 18 is formed with first and second spaced-apart wheel depressions or wells 18a and 18b which in part overhang respective wheels 12a, b. Tank 18 also includes a cavity 18c located between wheel wells 18a, b and near the base tank 18. The depression or cavity 18c provides a region wherein a user can insert his or her foot for purposes of rotating the cart 12 from its resting position on the surface S. The tank 18 also includes a removable cap 18d by which it can be filled with fuel such as gasoline.

The tank 18 is attached to the cart 12 by means of first and second molded tabs 18e, 18f integrally formed therein. The tabs 18e, f define borings 18e-1, 18f-1 (see FIG. 1E) which slidably receive shock mounts 20a, 20b.

The shock mounts in turn define internal borings 20a-1 and 20b-1 which in turn slidably receive handle 14-6. The two sides 14-6a and 14-6b of the handle 14-6 slidably engage respective borings 20a-1 and 20b-1 in shock absorbers 20a, 20b and then in turn engage upper ends of the legs 14-1a, 14-2a. The engagement between the handle 14-6 and the legs 14-1a, -2a resiliently locks the upper end of the tank 18 to the cart 12.

The tank 18 is locked at a lower end 18e (best seen in FIG. 3) to an elongated, non-rotatable axle 22 which extends between L-shaped sections 14-1, -2 and is attached thereto in the general vicinity of right angle curves 14-1c, -2c which join the upper and lower legs of each respective L-shaped sections. The support member or axle 22 is substantially parallel to a plane formed by members 14-3a, -3b and perpendicular to lower legs 14-1b, -2b of the L-shaped sections 14-1, -2. In addition to rotatably supporting wheels 12a, b at ends thereof, the axle 22 exhibits a flat central region 22a which provides a support for a lower surface 18h of the tank 18.

Figure 3:
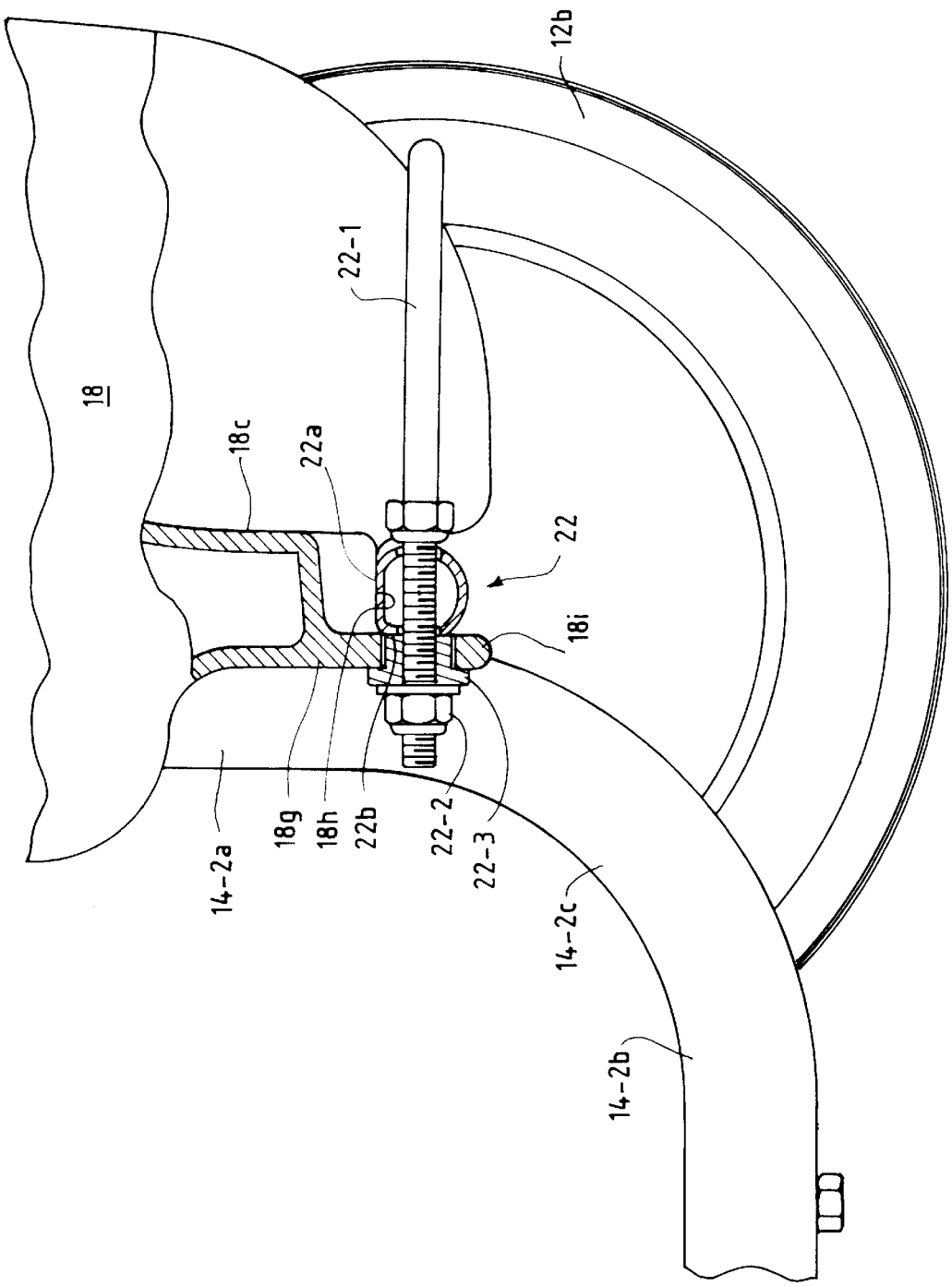
FIG. 3 is an enlarged view, partly in section, of a portion of the system of FIG. 1B.

The tank 18 also includes a lower locking flange or tab 18g, integrally formed therein, which extends from the lower end of tank 18 and abuts a retaining surface 22b of the axle 22. As illustrated in FIG. 3, the tab 18g extends past the axle 22 adjacent surface 22b thereof, and terminates at end region 18i. This configuration locks the lower end of tank 18 against the cart 12.

A U-bolt 22-1 extends through the shaft 22, through the locking tab 18g and is held in place by a nut 22-2. The U-shaped bolt 22-1, in combination with depression 18c also facilitates a user rotating the cart 12 from its resting position on the surface S to a moving position wherein rubber feet 12c, d are elevated such that the system 10 can be rolled on the wheels 12a, b.

A bushing 22-3 can also be provided adjacent to the nut 22-2 to further facilitate clamping the tank 18 against the axle 22. The bushing 22-3 can be formed, for example, of a deformable plastic.

As a result of the advantageous construction and arrangement of the tank 28 and the cart 12, the tank 18 is secured locked, at its upper end via tabs 18e, f and at its lower end by tab 18i to the cart 12. Additionally, when full of fuel, the tank 18 serves as an effective counterweight to the engine and other components carried on the cart 12 thus facilitating rolling movement thereof.

A source 26 is coupled to the engine 16. The source 26 is a source of electrical energy and is mechanically coupled to the vertically oriented output drive shaft of the engine 16.

The source 26 could be implemented, as those of skill in the art will understand, as a DC generator followed by a DC to AC converter. Alternately, source 26 could be implemented as an alternator.

It will be understood that the details for the source 26 are not a limitation of the present invention. A variety of sources exhibiting different output power, frequency and voltage ratings may be used without departing from the spirit and scope of the present invention.

As noted above, when the engine 16 and the source 26 are coupled together, they share a common axis of rotation which is perpendicular to the surface S. The engine 16 has a connection interface 16a which includes a plurality of flanges, bolt holes and positioning surfaces for mounting and aligning the vertically oriented output shaft of the engine 16. One such interface is specified in SAE Standard No. J609A.

As is discussed in more detail subsequently, engine 16 rests on an engine pan, indicated generally at 28, which has a first planar surface 28a positioned adjacent to a mounting surface 16a-1 of the engine 16. The pan 28 is formed with first and second spaced apart side flanges 28b, c which extend substantially perpendicular to the surface 28a. The pan 28 may include a front slotted flange 28c also substantially perpendicular to the surface 28a.

The pan 28 is attached to the cart 12 via shock mounts 28-1 and supports the combined engine/source combination 16/26. Panels 30a, b fill spaces in L-shaped sections 14-1, -2 between the pan 28 and lower horizontally extending legs 14-1b, -2b.

Control panel 30a carries a plurality of AC plugs, energy output ports, 32a into which electrical plugs can be inserted for purposes of receiving energy from system 10. Panel 30a also includes control switches and the like, 32b. as would be understood by those of skill in the art which could include circuit breakers, idle control switches, ignition key for use with electric start models, and engine on/off switch for manually started engines.

The panel 30a also carries an elongated cord retaining element 32c discussed subsequently. It will be understood the sockets 32a could include a variety of AC outlets as desired. The panel 30a also includes a plurality of horizontally extending slots indicated generally at 32d to promote air flow and ventilation of the source 26.

Figure 1B:
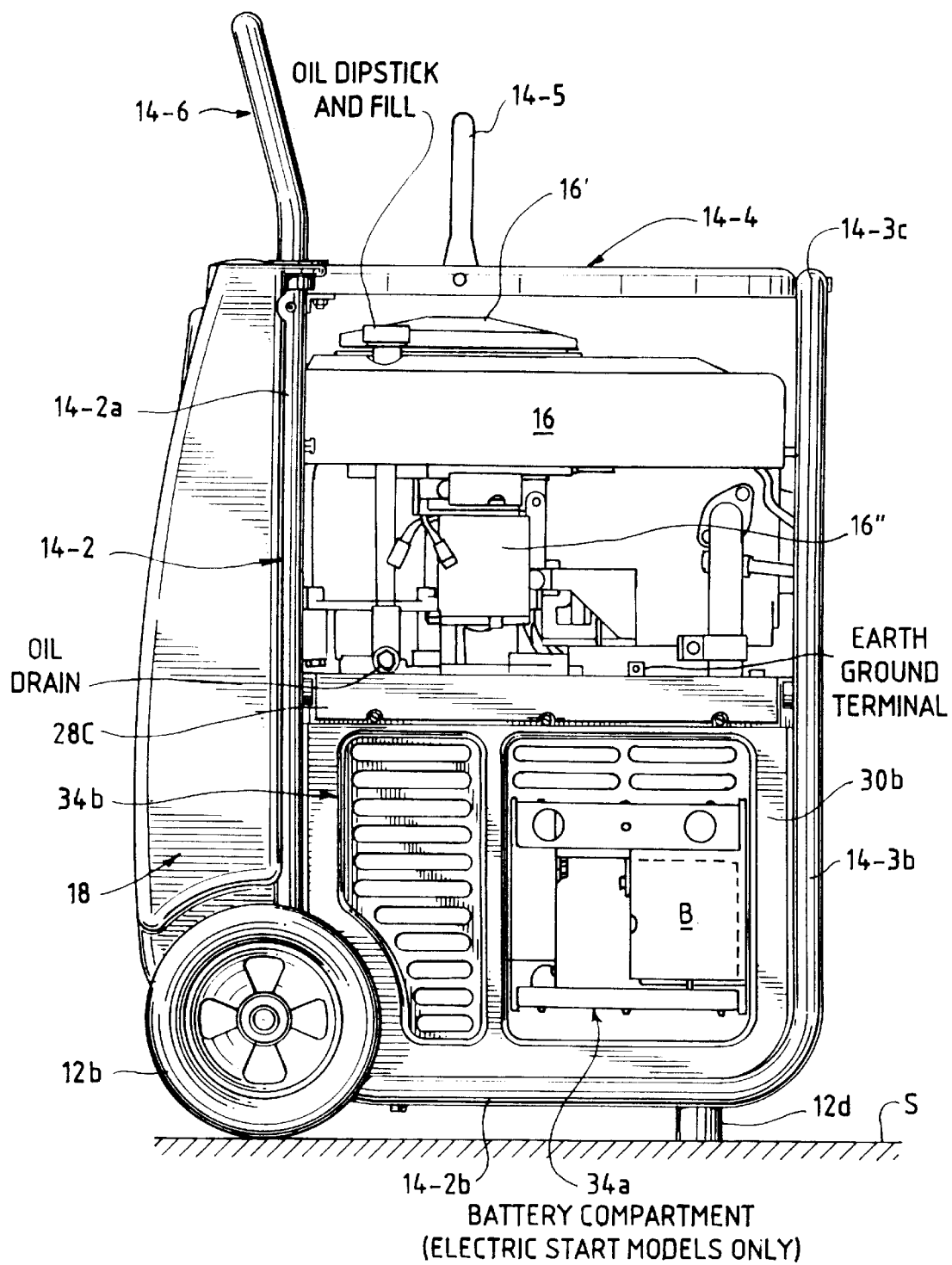
FIG. 1B is another side view of the system of FIG. 1A.
Figure 1C:
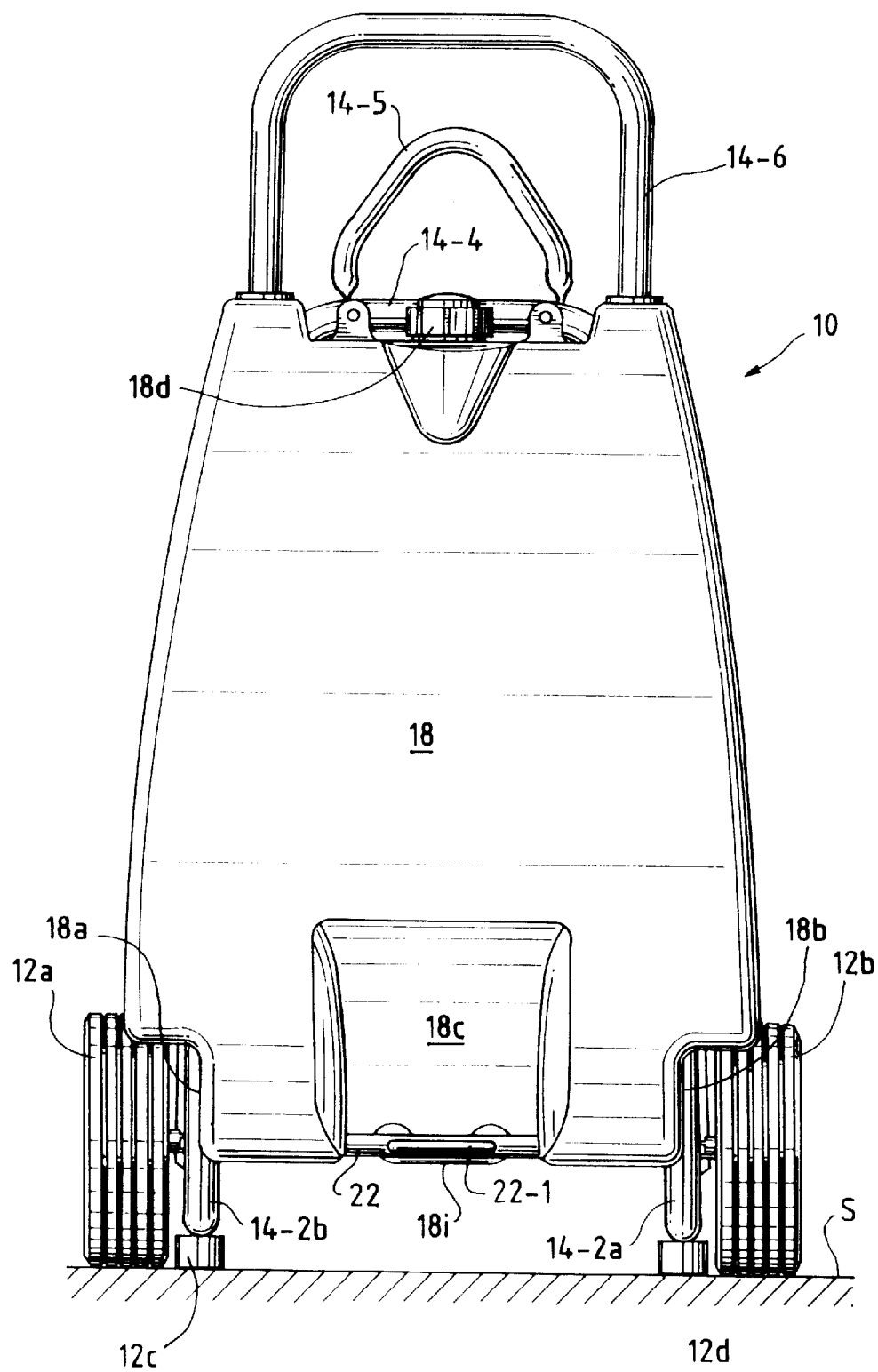
FIG. 1C is a rear view of the system of FIG. 1A.
Figure 1D:
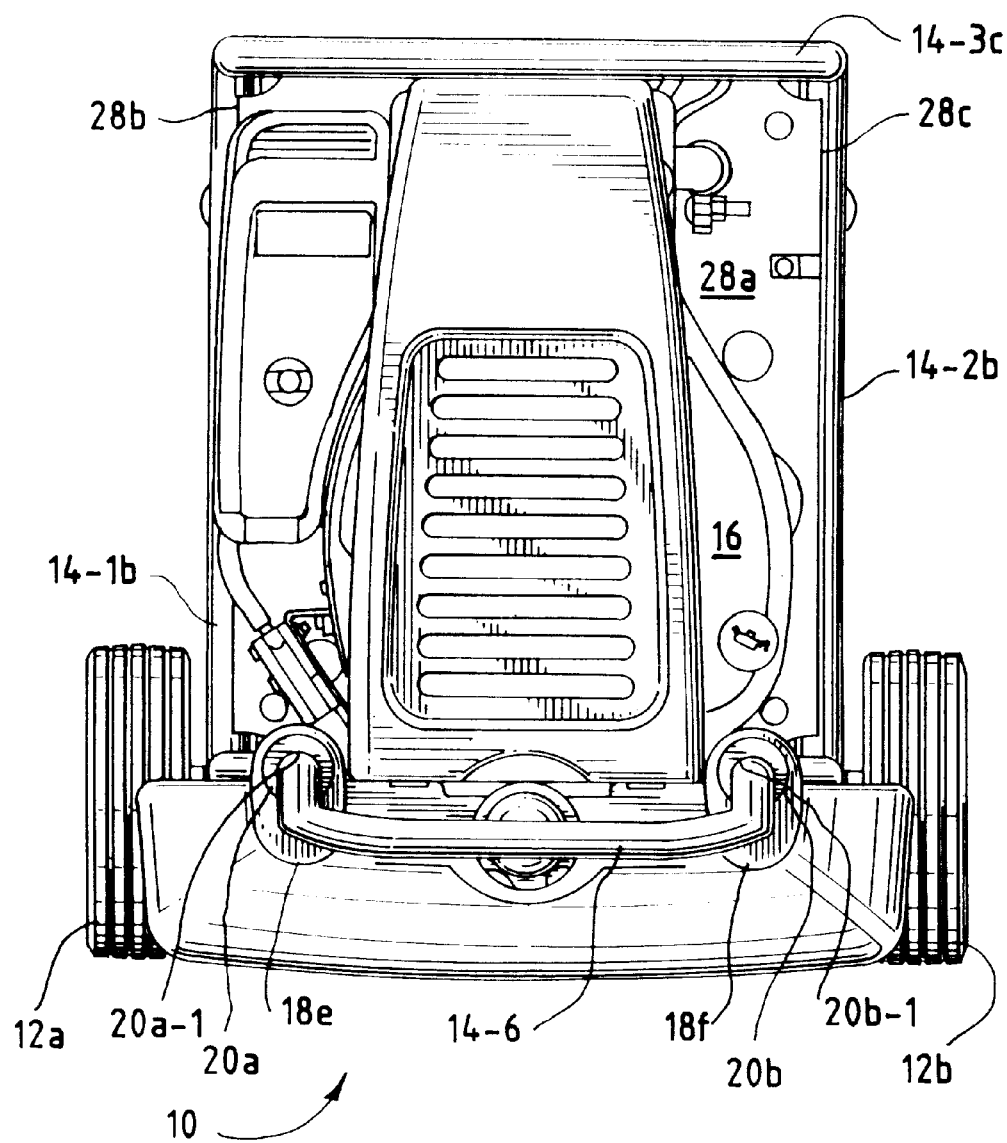
FIG. 1D is a top view of the system of FIG. 1A.
Figure 1E:
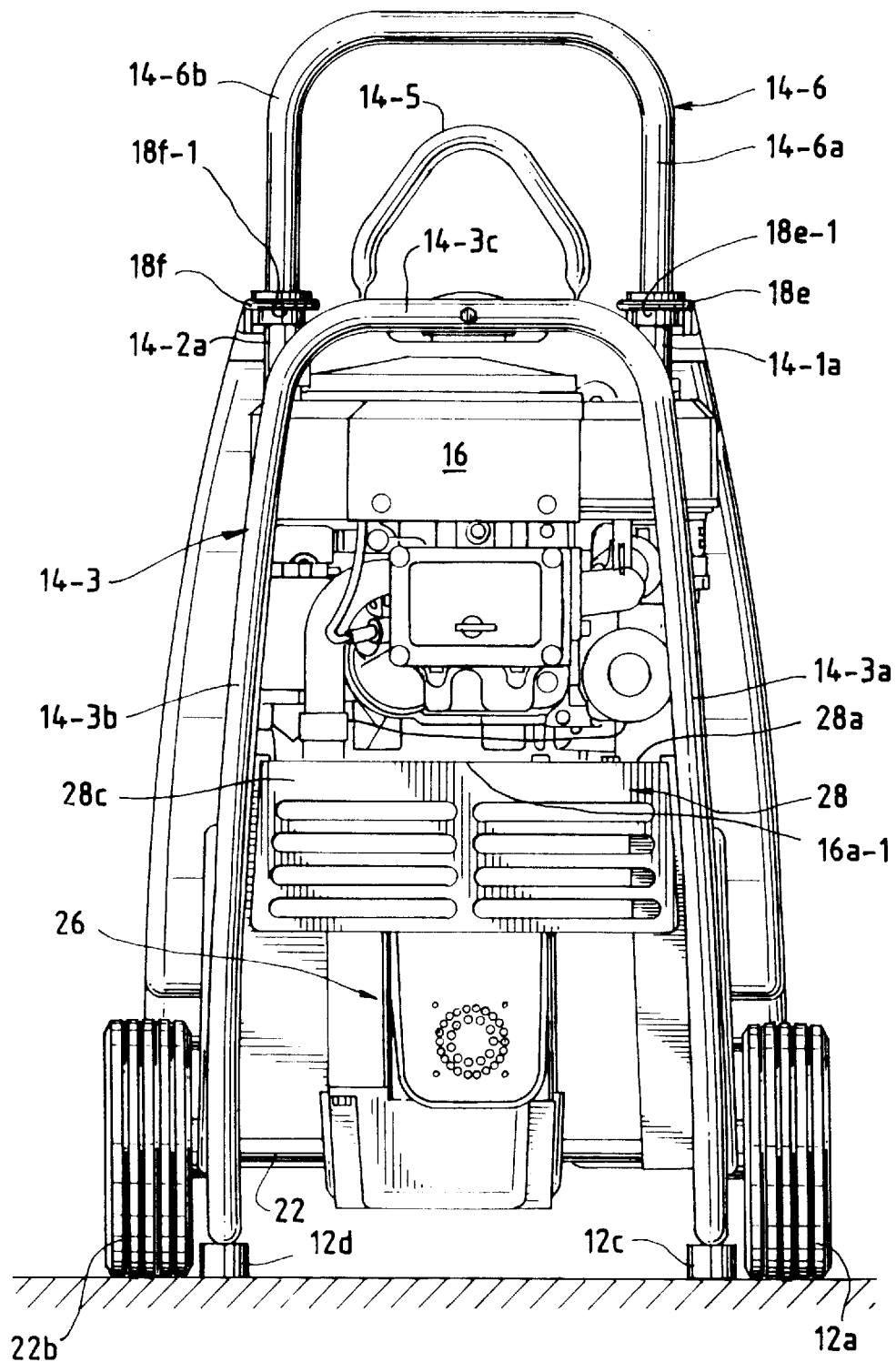
FIG. 1E is a front view of the system of FIG. 1A.

The panel 30b, in the version illustrated in FIG. 1B carries a battery compartment 34a which can be used to support a rechargeable battery, indicated in phantom where the system 10 is provided with an electric start capability. An auxiliary alternator 16"(best shown in FIG. 1B) provides a source of AC which when rectified can be used to recharge battery B.

Figure 2A:
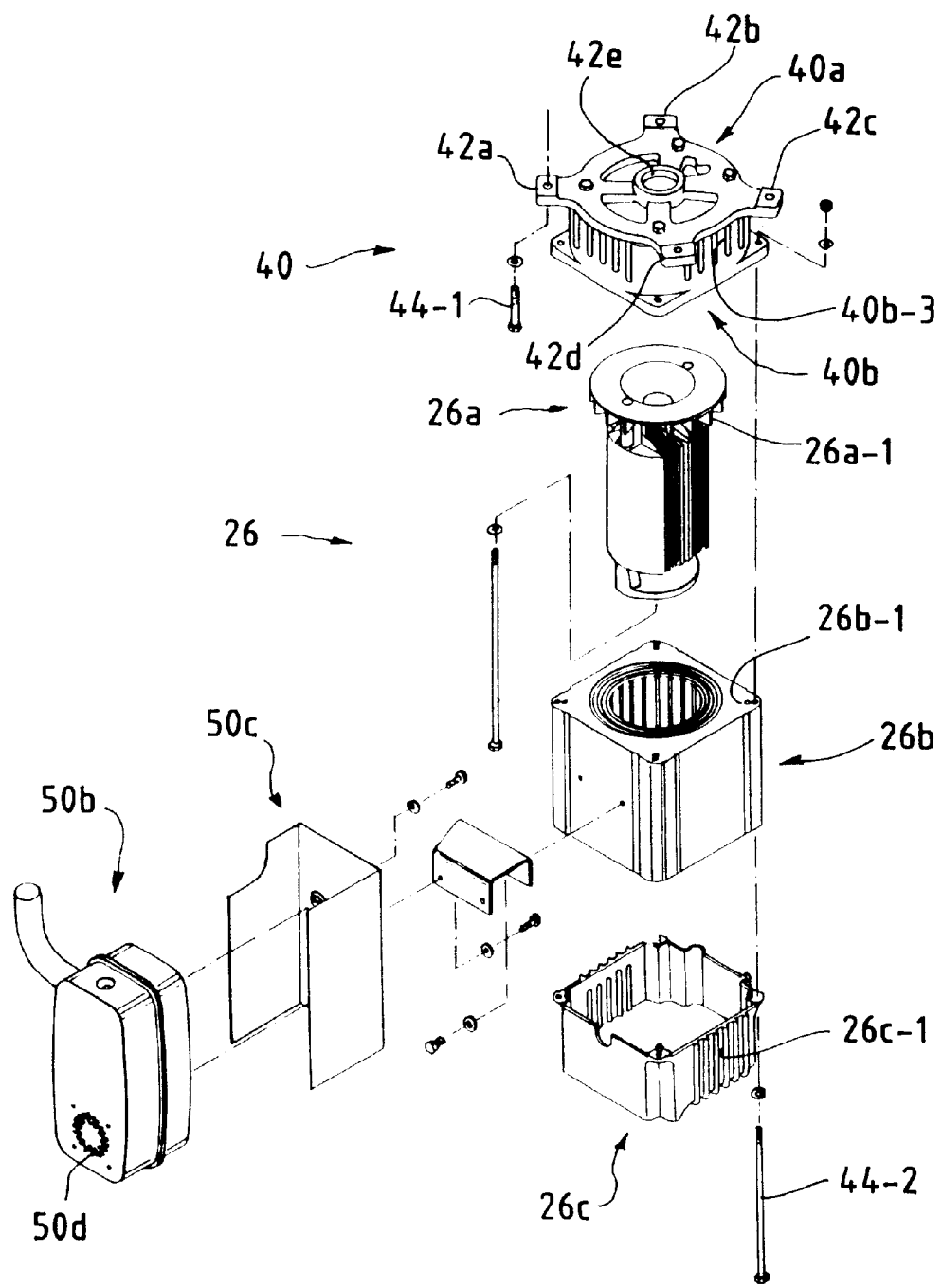
FIGS. 2A through 2C, taken together, are an assembly view of the system of FIG. 1A.
Figure 2B:
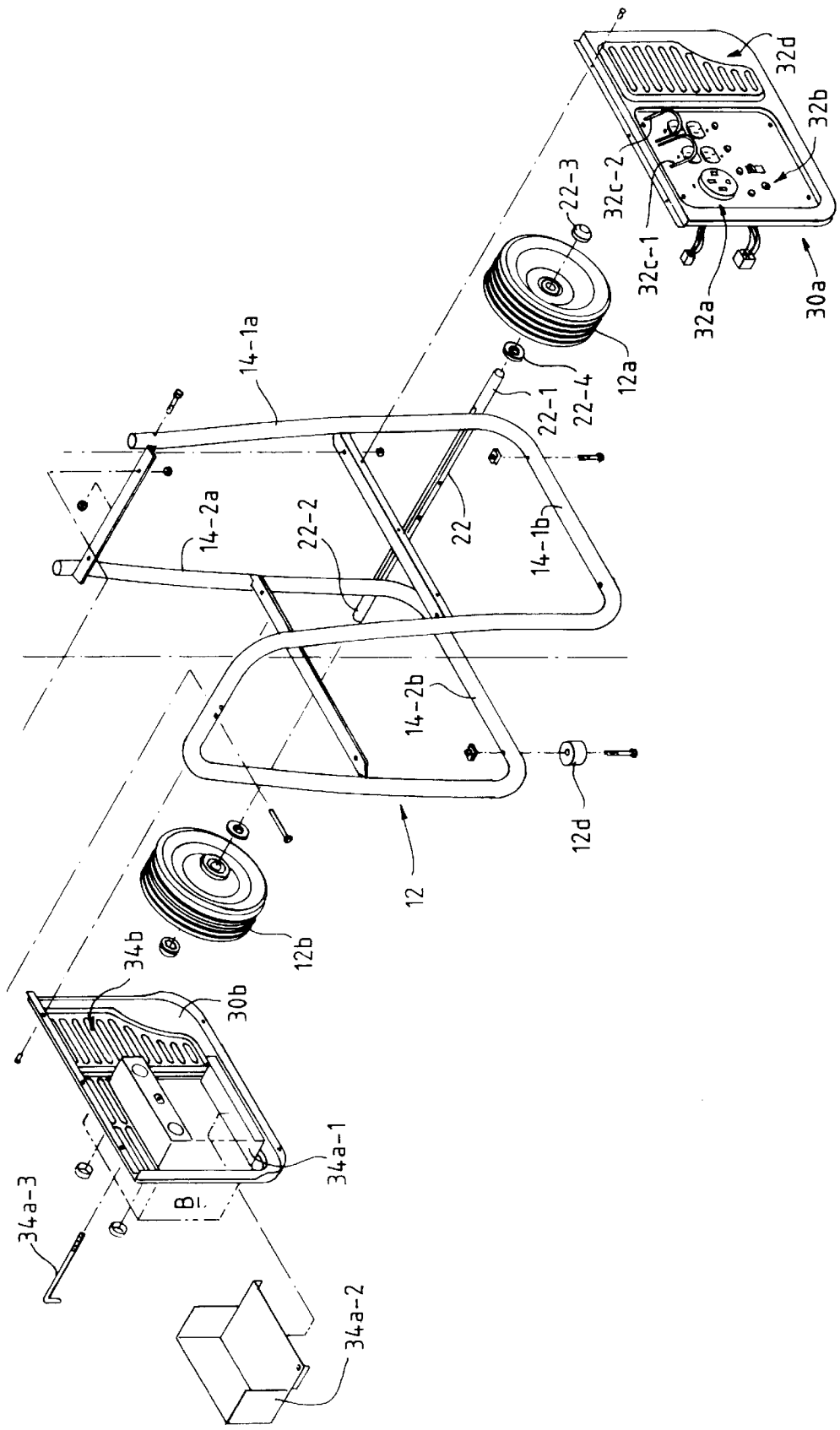
Figure 2C:
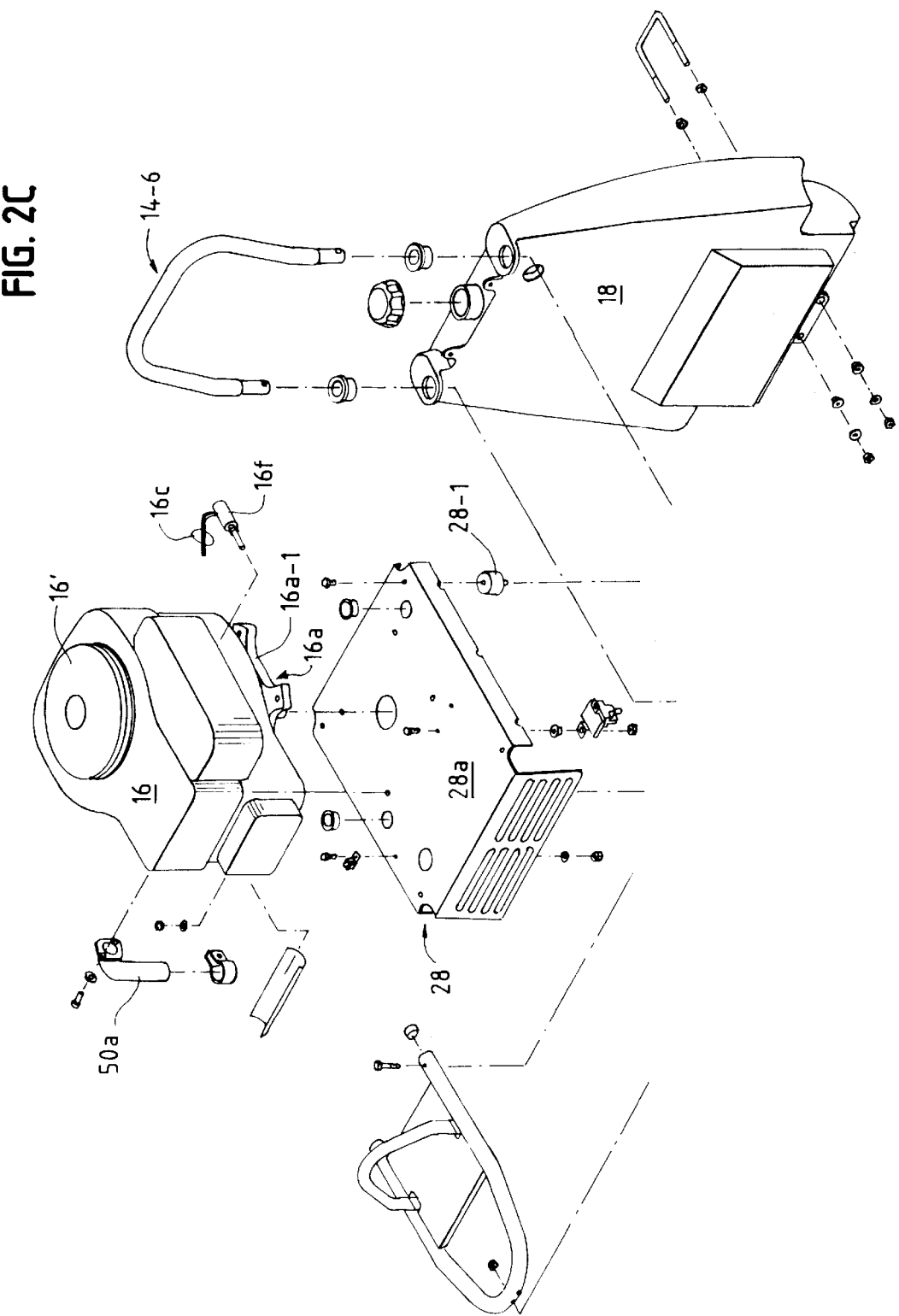

As illustrated in FIG. 2B, panel 30b includes a battery support shelf 34a-1 which is intended to support the battery B in normal operation. If desired, a snap-in supplemental battery support drawer 34a-2 can be snap-fit with the support bracket 34a-1 to provide more of an enclosure for the battery B.

A rotatable L-shaped bolt 34a-3 is threadably supported on panel 30b. The bolt 34a-3 can be rotated into contact with an upper region of the battery B to further retain the battery on the shelf 34a-1. The panel 30b also carries a plurality of ventilation slots indicated generally at 34b.

Figure 1F:
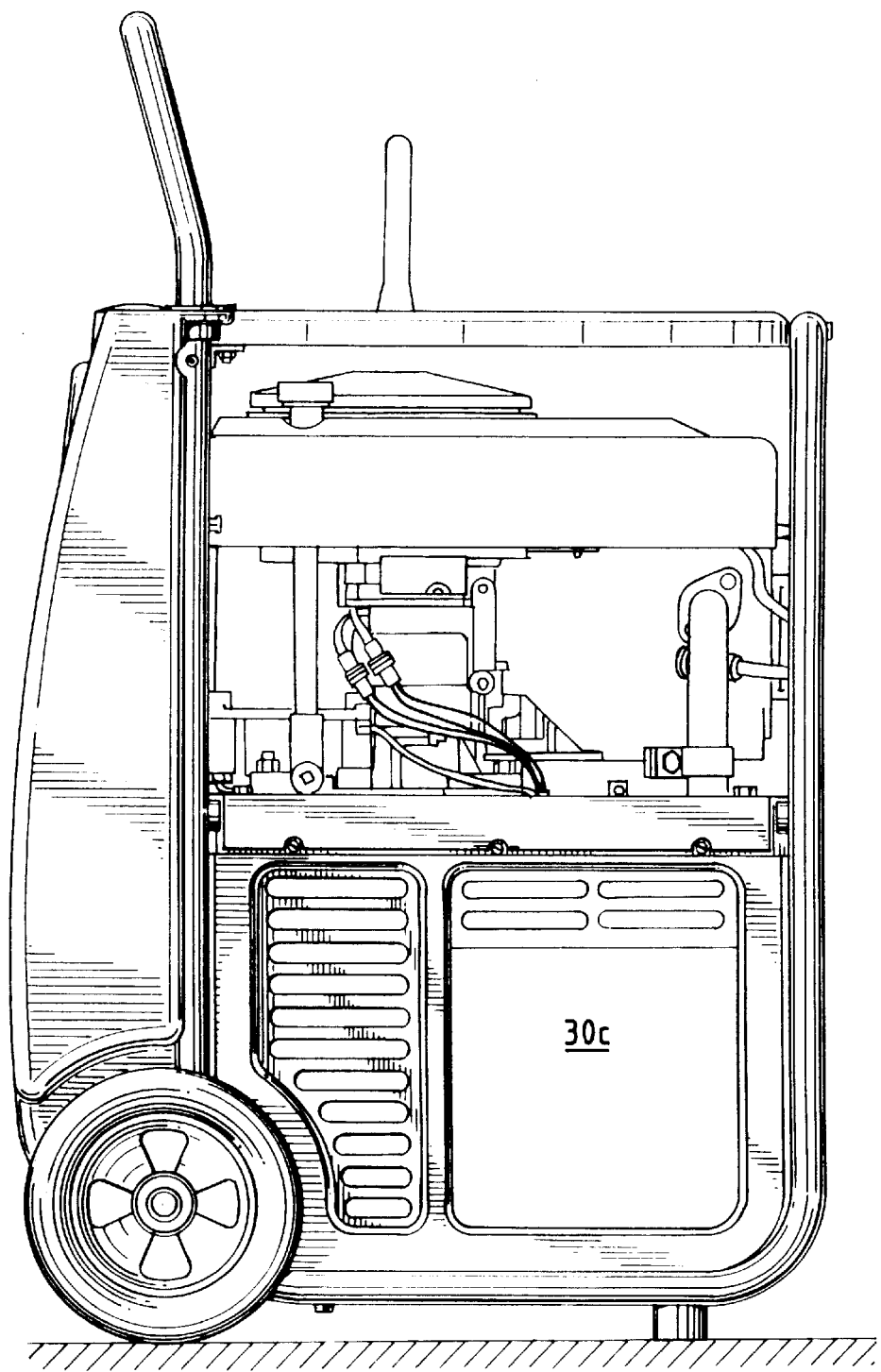
FIG. 1F is a side view of an alternate embodiment of the system of FIG. 1A.

FIG. 1F illustrates an alternate form 30c of the panel 30b. The panel 30c, as illustrated in FIG. 1F does not include the battery compartment 34a and would be used for those versions of the system 10 which did not include an electric start capability. It will be understood that the panels 30a, b, c could be removed and/or replaced as desired with other configurations without departing from the spirit and scope of the present invention.

With respect to FIGS. 2A–2D, source 26 is coupled to engine 16 using a two-part, modular, engine interface system 40. The interface 40 includes an engine interface member 40a and a source interface element 40b. Both of the elements 40a, b can be formed as separate castings.

Casting 40a is formed with a plurality of spaced-apart flanges 42a . . . d. The arrangement and layout of the flanges 42a . . . d are commensurate with the layout of the mounting interface 16a and mounting surface 16a-1 of the engine 16. The mounting holes in the flanges 42a . . . . d are intended to line up with the corresponding mounting holes on the mounting interface 16a.

Figure 4A:
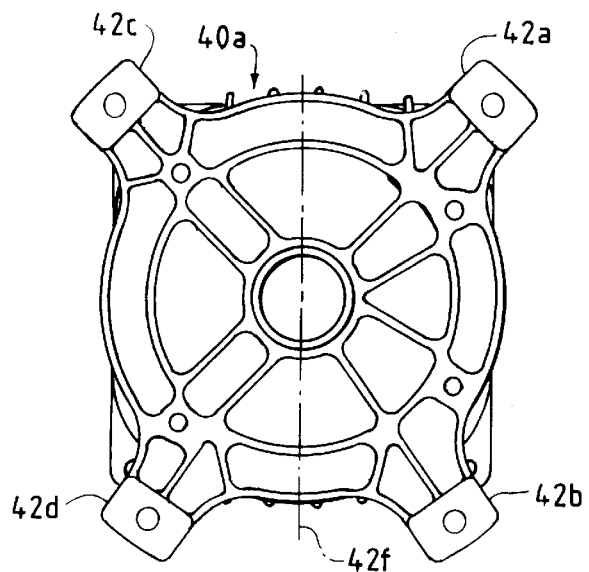
FIG. 4A is a top plan view of a modular two-part engine interface system.
Figure 4B:
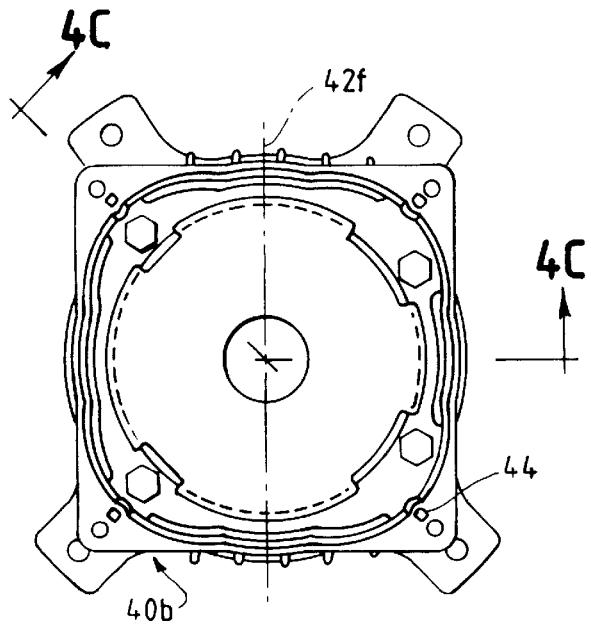
FIG. 4B is a bottom plan view of the system of FIG. 4A.
Figure 4C:
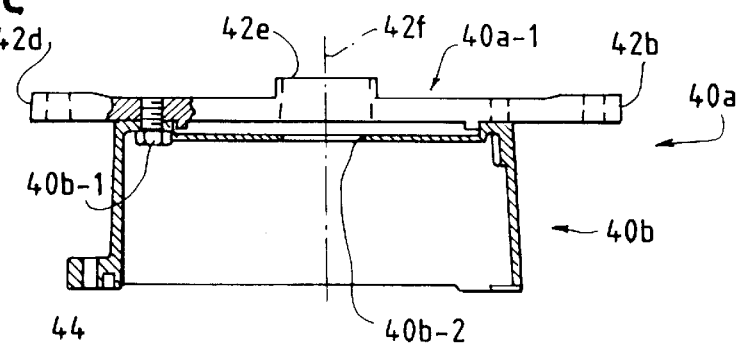
FIG. 4C is a view in section taken along plane 4C—4C of FIG. 4B.
Figure 4D:
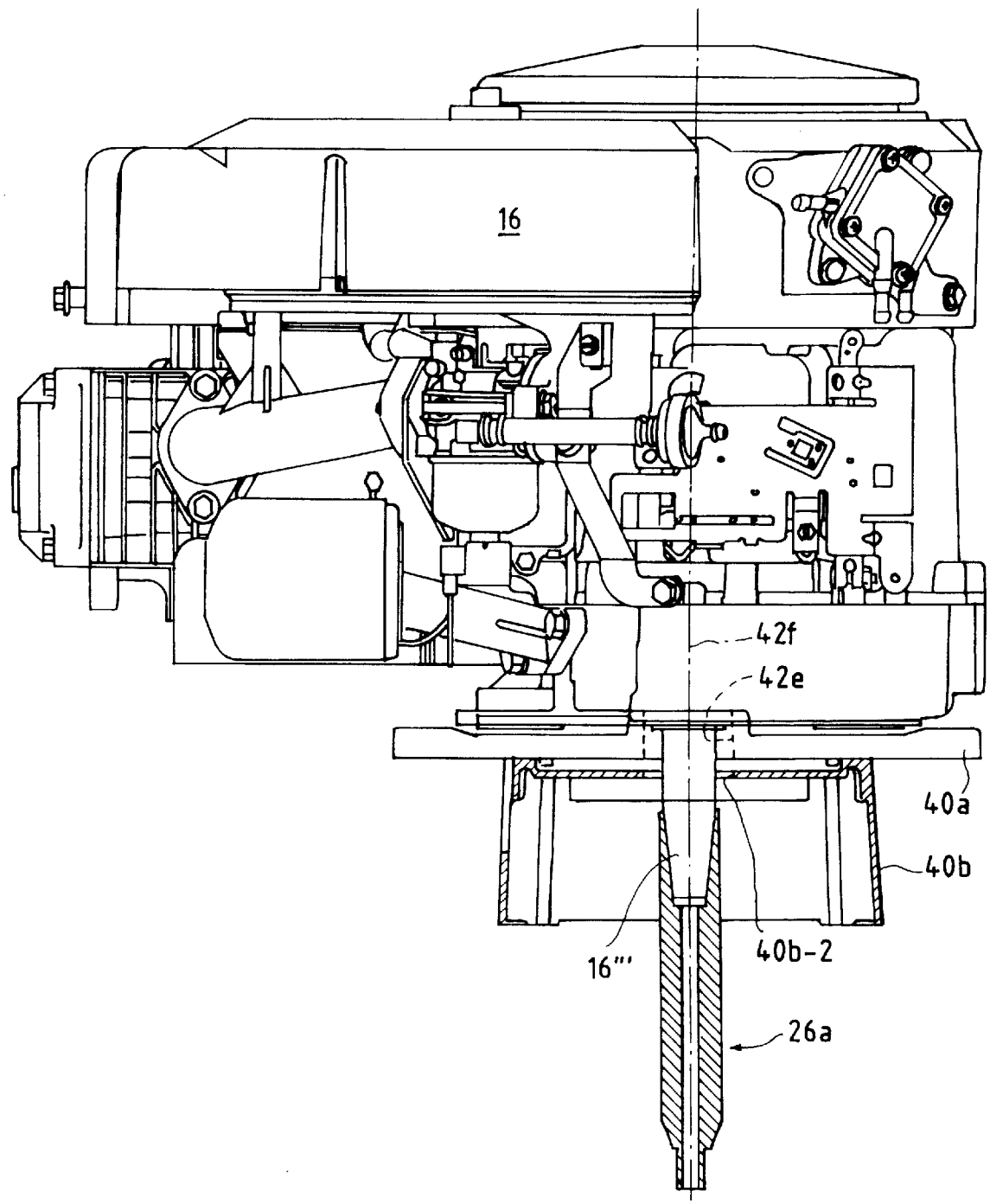
FIG. 4D is a side elevational view of an engine coupled to a rotor.
Figure 5A:
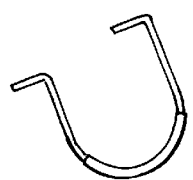
FIG. 5 illustrates alternate embodiments of cord retainers.
Figure 5B:
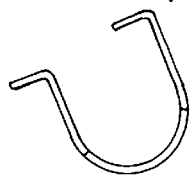
Figure 5C:
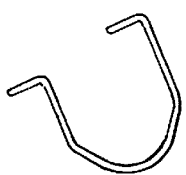
Figure 5D:
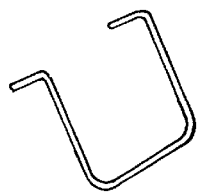
Figure 5E:
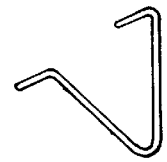
Figure 5F:
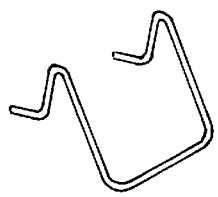
Figure 5G:
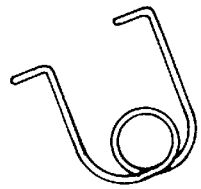
Figure 5H:
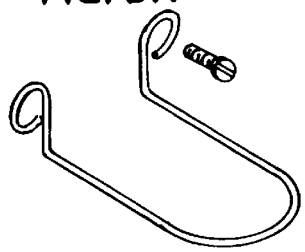
Figure 5I:
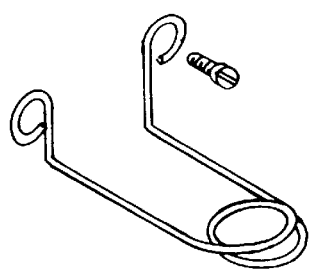
Figure 5J:
Figure 5K:
Figure 5L:
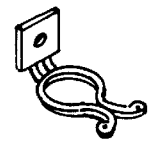

A centrally located boring 42e is intended to line up with a machined mounting surface of the engine 16 such that the axis of rotation of the output shaft of the engine 16 is aligned on axis 42f (best seen in FIG. 4D). The module 40a can thus be used with any one of a plurality of engines which has a common or standardized mounting interface corresponding to that of the engine 16. Where it would be desirable to use an engine with a vertically oriented output shaft which has a different mounting interface, the member 40a could be modified accordingly to be used with that different engine mounting interface.

The source interface element 40b is coupled to the engine interface module 40a via bolts 40b-1. The element 40b also defines a boring 40b-2, aligned with the boring 42e through which extends the output shaft of the engine 16.

Alignment of member 40a, and element 40b relative to the engine mounting interface 16a is advantageously achieved by carrying out machining operations relative to only one surface, indicated generally at 40a-1 of the combined structure of modules 40a, b. Though the modules 40a, b are castings, alignment can be achieved in part by incorporating four positioning dowel pins 44 in the base of element 40b.

The positioning pins 44 can, for example, be incorporated into the element 40b during the casting operation. They provide precise locating of that element during subsequent operations. As illustrated in FIG. 4B, a total of 4 positioning or dowel pins 44 are present in the element 40b.

When the member 40a is bolted to the element 40b, the assembly can be positioned in a machining center using pins 44. The surface of 40a-1 can then be machined relative to the pins 44. In this process, the flanges 44a . . . 42d can be machined, the holes therethrough can be drilled as needed, and the boring 42e, along with any associated machined surfaces can be formed relative to the pins 44 all with a single machining process.

The machined assembly 40 can then be combined with the mounting interface 16a for the engine 16 using mounting bolts 44-1 which extend through each of the flanges 42a . . . 42d into the engine mounting interface. With this installation, the pan 28 is sandwiched between the machined surfaces of the flanges 42a . . . d and the engine mounting interface 16a.

As illustrated in FIG. 2A, source 26 has been implemented as an alternator. It could also have been implemented as a DC generator.

The source 26 includes a rotor element 26a and a stator 26b. The rotor is coupled to the output shaft of the engine 16 and rotates on the axis 42f. Stator 26b is aligned using the four alignment pins 44 that extend from the module 40b into borings 26b-1 in the stator 26b. The stator 26 is then coupled to element 40b by bolts 44-2 that extend through stator 26b.

The bolts 44-2 do not align the stator 26b relative to the output shaft of the engine 16. Rather, the pins 44 which extend form the module 40b and into the stator 26b provide this alignment.

Source 26 is closed with a lower housing 26c which can support a lower rotary bearing for the rotor 26a. Housing 26c can also support and protect other circuitry, as would be known to those of skill in the art, for exciting source 26 depending on the requirements thereof.

Thus, one of the important advantages of the modular interface combination 40 lies in the fact that only a single machining process need be carried out on the surface 40a-1 of the module 40a to achieve the necessary alignment between the output shaft of the engine 16, the rotor 26a and the stator 26b.

It will be understood that the modular interface combination 40 can be formed or cast as a single component.

An exhaust system for the engine 16 includes an exhaust manifold 50a which couples exhaust gases from an exhaust output port on the engine 16 through the pan 28 to a muffler 50b mounted below the pan 28. The muffler 50b is thermally isolated from the source 26 via a heat shield 50c.

A further advantage of the structure of the system 10 is in the separated air flow paths which can be achieved as a result of using an engine with a vertical shaft, such as the engine 16, as configured in the system 10. Engine cooling air can be drawn into the engine at the upper input port 16' and expelled from the front of the engine 16 toward flange 28c adjacent to surface 28a. This arrangement will isolate output cooling air flow of the engine 16 from source 26.

Cooling air for source 26 can be drawn into end housing 26c via slots 26c-1 therein, passed through stator 26b and be expelled through slots 40b-3 cast in the element 40b due to the action of fan blades 26a-1 carried on rotor 26a. The outflow of cooling air for the source 26, via slots 40b-3 in the element 40b is below the pan 28. This outflow can in turn pass through slots 32b, 34b in panels 30a, b.

Muffler 50b, which is thermally isolated from source 26 via shield 50c expels heated exhaust gases via a port 50d out the front end of the system 10. This is in a direction which is oriented away from the location of source 26.

As illustrated in FIG. 2B, system 10 includes two cord retaining elements 32c-1, c-2. These elements illustrated as two adjacent wire or plastic elements and are coupled to panel 30a.

An electrical cord can be drawn through either one of the loops 32c-1, c-2 before the cord is plugged into a respective one of the sockets 32a. With this configuration, the retaining elements 32c-1, c-2 prevent the cord from accidentally or inadvertently being unplugged from the respective socket 32a if it is pulled on or tripped over by accident. While in FIG. 2B the cord retainer 32c-1, c-2 are illustrated positioned above the respective sockets 32a, it will be understood that they could be positioned below those sockets with the same effect.

FIG. 5 illustrates alternate forms of cord retainers. Each of the retainers of FIG. 5 could be affixed to a panel such as panel 30a.

Design 5-A is a wire cord lock or retainer. A sleeve is fitted over the area which will contact the power cord. The sleeve may be of many different types of material such as rubber, plastic, etc.

Design 5-B is identical to design 5-A except the cord contact area is coated with a plastic or rubberized material using a dip and cure process.

The covering used on designs 5-A and B may be used with any of the following design variations as a cord protection device.

In Design 5-C the spring wire is bent slightly to allow for easier insertion and retraction into the adjacent panel. In design 5-D, the cord lock, when compressed to fit the mating holes in the panel 30a, will have a square appearance. Design 5-E depicts a triangular area in which the power cord will rest.

Design 5-F adds an additional bend to the portion of the cord lock which interfaces with the panel 30a. This will provide an additional locking function for the cord lock in the panel.

Design 5-G can be produced with any of the other configurations by adding a loop in the cord retention area to better secure the cord.

Designs 5-H and 5-I can also be produced in any of the previous configurations. The attachment to the panel is by the use of an additional fastener such as a screw or rivet.

Designs 5-J, -L utilize commercial fasteners which can be purchased from various vendors. All are attached to the panel 30a using a separate fastener. The power cord is captivated within the loop formed in each fastener.

Figure 6A:
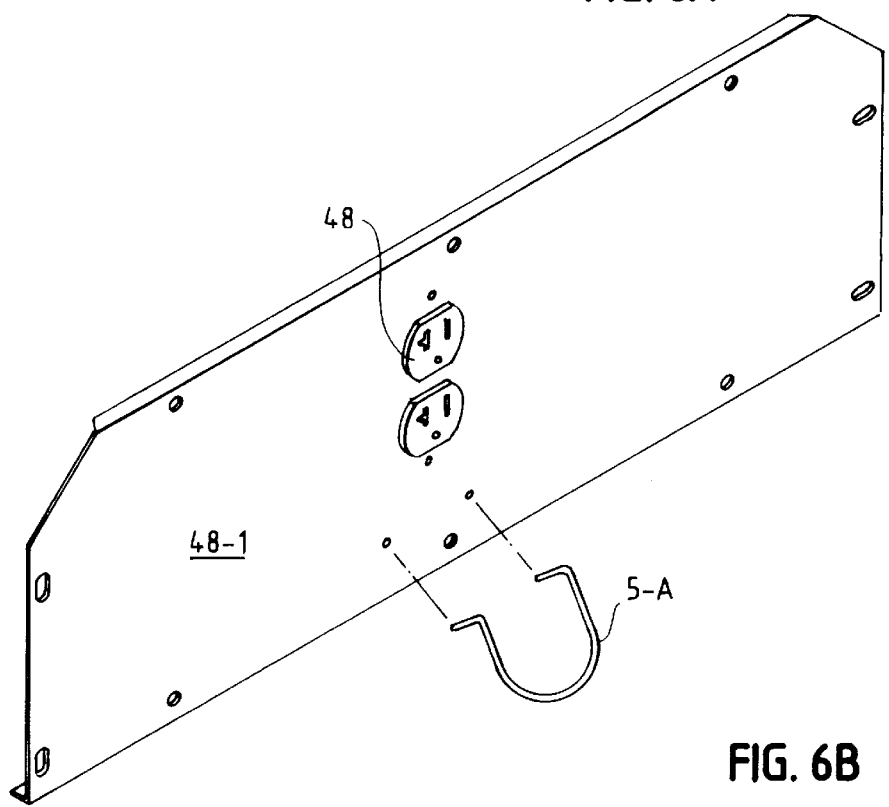
FIGS. 6A and 6B illustrates use of a cord retainer.

FIGS. 6A and B illustrate use of a cord retainer, such as a retainer 5-A, used to retain a cord C which is to be plugged into an AC outlet 48. As illustrated in FIGS. 6A and B, the outlet 48, which could be for example mounted on a panel such as the panel 30a, slidably engages the electrical plug P on the end of the cord C and supplies electrical energy thereto. In the event that the cord C is inadvertently kicked, or pulled upon, plug P could unexpectedly be pulled from socket 48. Depending on the circumstances, the unexpected removal of plug P from socket 48 could be very undesirable.

Figure 6B:
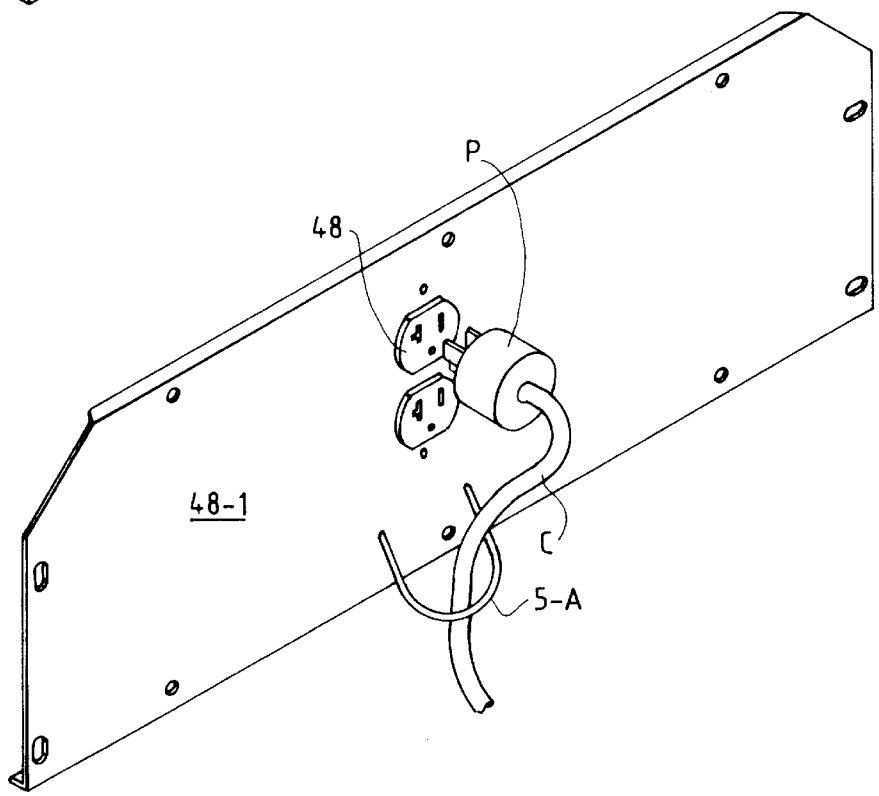

The retainer 5-A minimizes the likelihood of plug P being unexpectedly jerked or yanked from socket 48. The retainer 5-A could be formed for example of spring wire and inserted into first and second spaced apart holes in the respective panel 48-1. It will be understood that while the retainer 5-A is illustrated in FIG. 6B located relatively below socket 48, it could be located above socket 48 as illustrated in FIG. 2B. As installed, if cord C is pulled upon, the spring characteristics of the retainer 5A minimizes likelihood of the plug P being jerked from the socket.

With respect to FIG. 2B, as illustrated therein, wheels 12a, b are rotatably carried on ends 22-1, -2 of axle 22. The wheels 12a, b are retained on the ends 22-1, -2 by push-on nuts 22-3 of a conventional variety. A washer 22-4 is positioned between an interior surface of each of the wheels 12-a, b. The respective wheel rotates between the respective nut 22-3 and the respective washer 22-4. The respective washer 22-4 prevents the respective wheel from rubbing against the edge of the cart 12.

Figure 7:
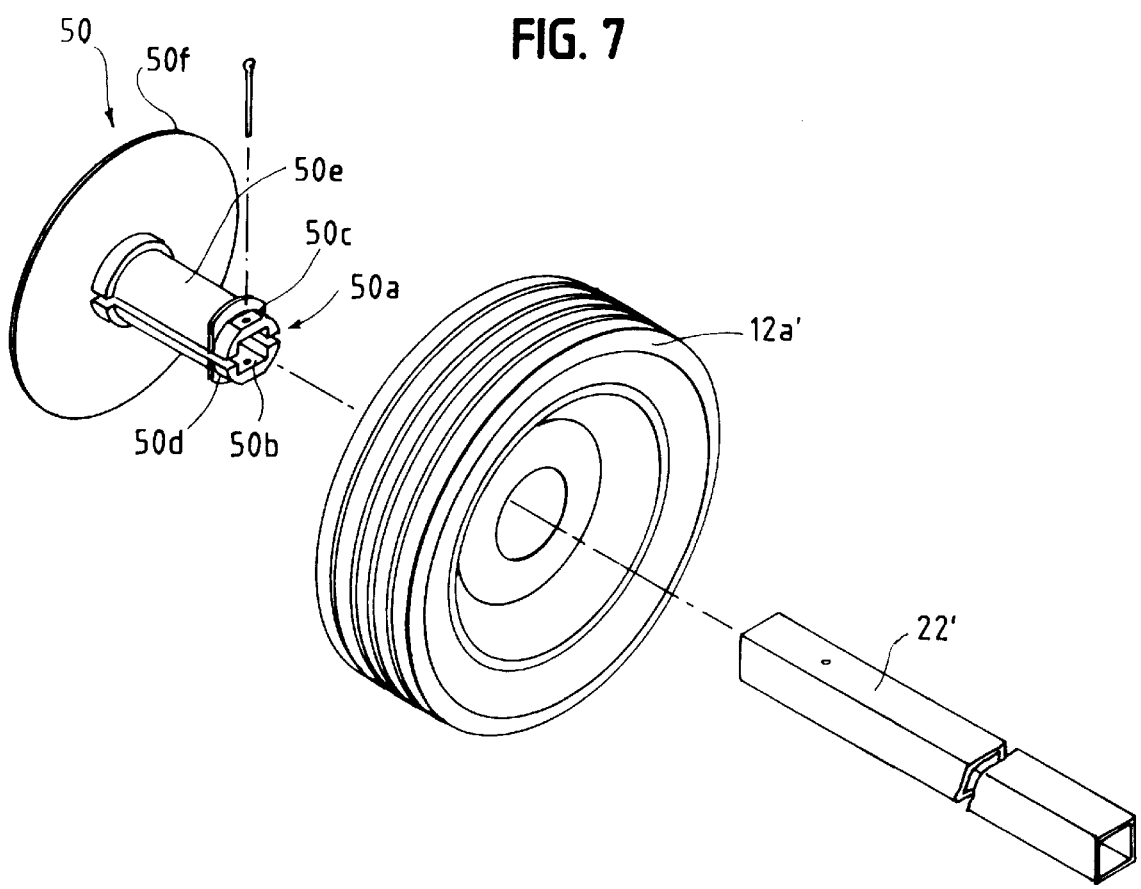
FIG. 7 is an enlarged sectional view illustrating a portion of an alternate wheel assembly.

An alternate wheel support and retaining structure is illustrated in FIG. 7. As illustrated in FIG. 7, an axle 22', comparable to the axle 22, is shown in section. The axle 22' has a non-circular cross section. It could be square, rectangular or have any other non-circular cross section. While illustrated as a hollow member, axle 22' could be solid.

The wheel 12a' is carried rotatably on axle 22'. The wheel 12a' is rotatably supported by a one-piece molded plastic hub 50.

The hub 50 includes a body portion 50a which defines an interior region 50b shaped so as to be compatible with the exterior shape of the axle 22'. Hub 50, as illustrated in FIG. 7, is pushed onto axle 22'. It will also be understood that hub 50 could be formed with a stem which slides into an interior region of the shaft 22' without departing from the spirit and scope of the present invention.

The body 50a carries a latching region 50c with at least one molded biased latch 50d carried thereon. A rotatable wheel support region 50e is integrally formed with the latch region 50c. The region 50e supports wheel 12a' for rotation.

A non-rotating hub cap 50f is integrally formed with the region 50e. The wheel 12a' is retained between hub cap 50f, which can present a decorative, non-rotating, appearance as the wheel assembly moves across the floor and the biased latch 50d.

For installation, the wheel 12a' is forced over the latch 50d onto the region 50e. When properly located, latch 50d rebounds and assumes its locking position thereby retaining the wheel on the region 50e. If desired, a plurality of biased latches could be used to minimize wobble as wheel 12a' rotates.

FIG. 8 illustrates a speed control system usable to control output rotary speed of shaft 16''' engine 16. The shaft 16''' engages rotor 28a whereupon those coupled elements rotate about the axis of rotation 42f.

As illustrated in FIG. 8, engine 16 includes a carburetor 16b of a conventional variety which has a throttle or speed control lever 16c. The throttle 16c extends from carburetor 16b to speed control system 16d.

In one aspect, and without limitation, speed control 16b can be implemented as a conventional mechanical governor. As is known to those of skill in the art, as the current drawn from the system 10 increases, the fuel to the engine 16 must be changed to maintain substantially continuous rotary output speed at the shaft 16''' such that where source 26 is implemented as an alternator 50–60 Hz AC can be drawn from the stator 26b. It will be understood that the speed control system 16d could be implemented using solid state non-contact speed sensors if desired.

An output pivot point 16d-1 carries a lever 16e which is coupled to the throttle control 16c. It will be understood by those of skill in the art that in normal operation where the speed control 16d is implemented as a governor, speed fluctuations at the shaft 16''' are mechanically detected causing a rotary change in the pivot 16b-1 which in turn translates to movement of control lever 16e. This will in turn adjust the carburetor 16b via throttle lever 16c.

In accordance with the present invention, operation of speed control 16d can be disabled where no AC current is being drawn from sockets 32a. In this instance, the engine 16 will operate at a relatively low idle speed conserving fuel.

An over-ride control system 60 includes an AC sensor 60a which could be implemented in a variety of ways without departing from the spirit and scope of the present invention. AC sensor 60a could detect load current being drawn from sockets 32a. Alternately, sensor 60a could detect a drop in output voltage in response to the presence of a load being coupled to sockets 32a.

Where a withdrawal of AC energy or AC power has been sensed at sensor 60a, that sensed withdrawal can be converted in circuitry 60b to coil drive signals. Coil drive signals are communicated via line 60c to speed control disabling coil 60f.

Where output energy from source 26 is being drawn at a level at or below a predetermined threshold, for example, zero amps, a coil drive signal is coupled via a line 60c to coil 16f energizing same. This in turn attracts control level 16e which moves on the order of a quarter of inch. As a result of this movement of throttle control 16c engine 16 is throttled down and assumes a relatively low output speed, idle condition.

When a load is coupled to the AC output ports 32a, the presence of electrical energy or power being drawn from source 26 is picked up at sensor 60a and coupled to circuitry 60b. Circuitry 60b in turn ceases to provide drive current to coil 16f. This in turn releases control lever 16e. Hence, speed control system 16d can speed up the rotation of shaft 16''' of engine 16 to its required velocity to output 50–60 Hz AC-type energy.

Control circuitry 60 can be energized via power supply 60d which in turn receives AC-type electrical energy from either alternator 16', which is used for purposes of recharging the battery B where electric start functionality is available, or from a supplemental winding on the stator 26b of the main generator or source 26. It will also be understood that the circuitry 60 could be integrated into a single control module 70 along with any alternator excitation circuitry needed for driving source 26 when implemented as an alternator.

The control module 70, see FIG. 9, includes three circuits interconnected to each other. These are idle control, battery charger, and voltage regulator circuits.

Power to the module 70 is supplied off of an excitation winding 26b-2 on the stator 26b via J3-1 and J3-3. Voltage regulator function—the AC voltage from J3 is supplied by the excitation winding 26b-2 in the stator 26b AC voltage from J3 is rectified by diodes D1, D2 and capacitor C1 and is fed to the module 70 as a DC voltage.

The module 70 senses the AC voltage present on lines L1 and L2. The amount of DC voltage supplied to the field 26a-2 of the generator 26 through the brushes and slip ring is controlled by the module 70 and is dependent on the level of AC voltage across L1 and L2.

Controlling the field voltage in this manner provides voltage regulation to the AC output voltage present on lines L1, L2 and N. This voltage is supplied through J2 and comes from the main power winding 26b-3 of the stator 26b.

The module 70 also functions as the electronic control element for the idle control. Lines L1 and L2 are fed through current transformers in the module 70 which sense current flow in the AC output. If there is no current flow, the module 70 activates the idle solenoid 16f which in turn creates a magnetic force which attracts the lever 16c on the governor 16d. This attraction reduces the speed of the engine 16 to a predetermined idle speed substantially below the normal no load operation speed of the engine.

When the module 70 senses an AC current flow in the generator output, the idle solenoid 16f is deactivated. The engine speed is then allowed to return to that dictated by the speed control 16d.

The third function performed by the module 70 is to supply regulated DC battery charging energy to the battery B which is used to start the engine 16. The AC voltage supplied by J3 to the module 70 is rectified and reduced to an appropriate value and fed to the battery B. The current supplied is dependent on the charge level of the battery B. Taper charge and over current protection are supplied by the module 70 to protect battery B.

Without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An energy system supportable on a surface comprising:

an engine with a rotatable output with an axis of rotation oriented so as to be substantially perpendicular to the surface;

a source of electrical energy coupled to the engine output;

a sensor for detecting an electrical withdrawal from the source;

a speed control element for causing the output of the engine to exhibit a substantially constant speed over a range of electrical withdrawals from the source;

a disabling device, coupled between the sensor and the speed control element, for disabling same in the sensed absence of an electrical withdrawal above a predetermined threshold whereupon, in the presence of a disabled speed control element, the speed of the output decreases from the substantially constant output speed to a lower, idle speed.

2. A system as in claim 1 wherein the disabling device includes an elongated coil, wherein the coil is oriented with an axis that is substantially perpendicular to the shaft.

3. A system as in claim 2 wherein the speed control element includes a movable output element, coupled to a speed control input port of the engine and wherein when the coil is in a selected state, the movable element moves to an engine idle speed position.

4. A system as in claim 3 wherein the coil, when energized, is in the selected state.

5. A system as in claim 4 wherein the output element pivots and moves toward the energized coil to the engine idle speed position.

6. A system as in claim 1 wherein the speed control element includes a contactless speed sensor.

7. A system as in claim 6 wherein the disabling device includes a solid state circuit for disabling the speed control element.

8. A system as in claim 1 which includes circuitry for supplying energy, generated from operation of the engine, to the sensor and the disabling device.

9. A system as in claim 8 wherein the circuitry for supplying energy includes a selected alternator coil carried adjacent to the engine.

10. A system as in claim 3 wherein the speed control element includes a mechanical governor.

\* \* \* \* \*